United States Patent [19]
Staschiak

[11] Patent Number: 5,579,968
[45] Date of Patent: Dec. 3, 1996

[54] DRINK CADDY FOR OPEN TOP CONTAINERS

[76] Inventor: Vincent J. Staschiak, 8231 Greenwood View Dr. #711, Parma, Ohio 44129

[21] Appl. No.: 500,407

[22] Filed: Jul. 10, 1995

[51] Int. Cl.⁶ ..................................... B60R 9/00
[52] U.S. Cl. .......................... 224/274; 224/547; 224/555; 248/231.61; 248/231.71
[58] Field of Search .................................... 224/148, 274, 224/547, 555, 926; 248/231.61, 231.71, 295.11

[56] References Cited

U.S. PATENT DOCUMENTS

| | | | |
|---|---|---|---|
| 1,751,463 | 3/1930 | Backus et al. | 224/547 |
| 4,535,923 | 8/1985 | Manke | 224/926 |
| 5,007,612 | 4/1991 | Manfre | 248/231.71 X |
| 5,105,958 | 4/1992 | Patton | 224/148 X |
| 5,190,257 | 3/1993 | Gradei et al. | 248/231.71 |
| 5,310,155 | 5/1994 | Wu | 224/274 X |
| 5,320,263 | 6/1994 | Kobylack | 224/274 |

Primary Examiner—Renee S. Luebke
Attorney, Agent, or Firm—Standley & Gilcrest

[57] ABSTRACT

A holder for beverage containers such as cans, bottles, mugs, and insulated drink wraps that is mountable on an inclined tubular section such as a golf cart handle is disclosed. The beverage holder consists of brackets and expansion brackets, that are slid together using their reverse dovetail joints. There are also 2 thumbscrews (2 bolts), one for each side, that are screwed in until there is an equal amount of pressure against the tubular handle. This will create an outward pressure of the dovetail joints and prevent them from sliding apart. The thumbscrews also serve as the beverage container receptacle hanging point. The arm that extends from the receptacle has a keyhole-slot at the top. This keyhole slot will accept the thumbscrew head and then the shank, once pulled in a downward motion to lock in place. When in use the receptacle will be free swinging, so upon tilting the tubular section, the receptacle will tend to maintain a vertical orientation.

4 Claims, 3 Drawing Sheets

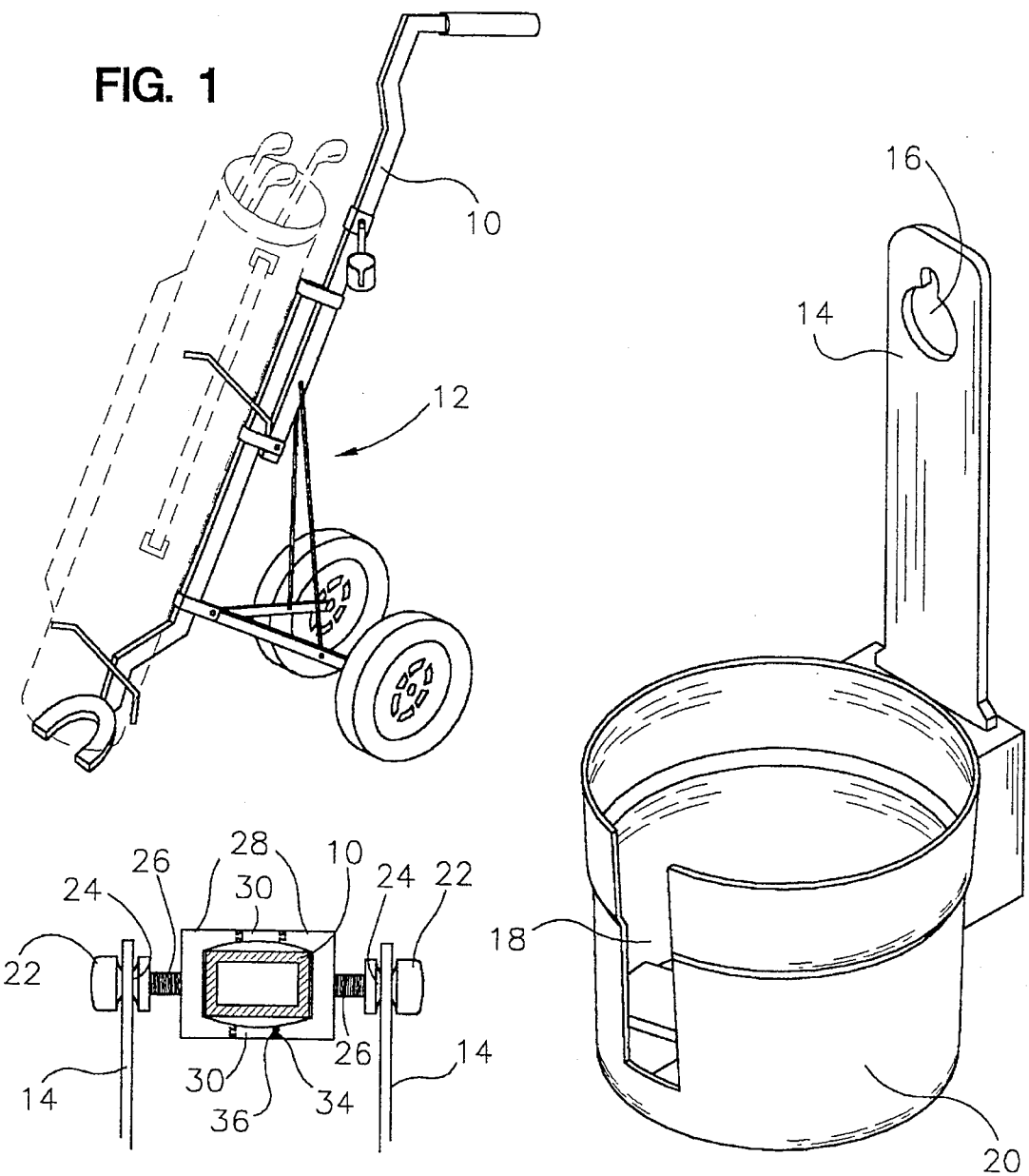
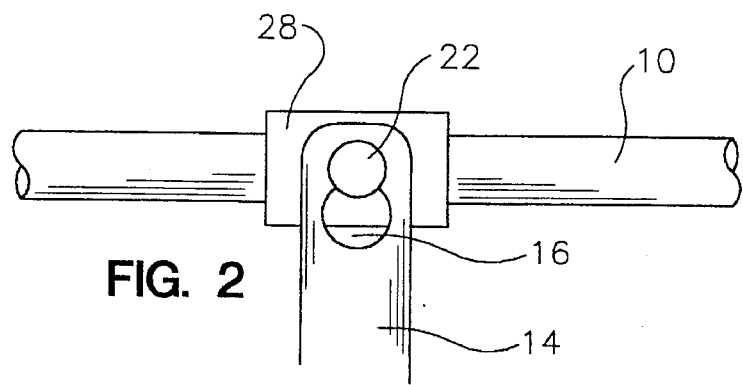

DRINK CADDY FOR OPEN TOP CONTAINERS

BACKGROUND-FIELD OF THE INVENTION

The present invention relates generally to carrier attachments for maintaining open top liquid containers in an upright position despite changes in the orientation of a supporting member; more particularly, the invention relates to such a carrier attachment which is particularly adapted for use on golf carts, and any other application that the clamp will mount to or the thumb screw can be mounted to, stationary or mobile.

Heretofore there has emerged a small variety of beverage can or bottle carriers and attachments for installation on golf bag carts and the like which include means for gravity balance such that the beverage container remains in an upright position notwithstanding the angle at which the golf cart is tilted.

None of the other units have exercised the ability of being able to adapt to different size tubings that the handles of the golf bag carts are manufactured from.

For example, U.S. Pat. No. 3,269,683 issued to Shinaver 1966, discloses a beverage container receptacle and clamp designed for use on a golf cart handle. The Shinaver invention employs a clamp that secures to the handle or which the beverage holder is mounted, all of which requires tools for installation and removal. U.S. Pat. No. 3,131,842 issued to Dingle and Hughes 1964, and U.S. Pat. No. 4,844,399 issued to Harm 1989, do not use the full potential of gravity, and also require tools for the installation and removal of the carrier mounting bracket.

It is thus evident that simplifying the process of manufacturing the unit design and making the installation and removal possible without any hand tools make the Drink Caddy (tm) a user friendly product. The object of this is to provide a golf bag cart beverage holder in which the pivot is part of the clamp, and the beverage holder is removable at any time. This enables the user to remove the holder at any time for what ever reason.

SUMMARY OF INVENTION

There is provided a golf bag cart beverage holder of the thumbscrew-keyhole type which may be easily mounted to the tubular section of a golf bag cart.

The clamp has various angles on the inside and on the outside of the pieces so that they are able to be used on all golf bag pull carts. These angles will change over time as different carts come into use by consumers. The sliding joints of the clamp can be of any shape and size. When sliding joints together they should not be able to be pulled apart, only slid apart from side to side.

The bolts that will be the hanging point of the drink holder will also be the part of the clamp that will hold the sliding joints together, by creating pressure on the joints. This will prevent slippage when tightened down on the tubing handle what ever size the tubing may be. These bolts can be different in shape and size as long as the drink holder itself is able to receive the bolt head and shank of the thumb screw through the keyhole shaped hole on the holder. The hanging portion of the holder may change in size and shape, and the holes may vary in size also.

The beverage carrier holder will be manufactured from several types of materials, such as plastics and metals with light properties, as the consumers' needs dictate. The carrier portion will be mounted to the cart by placing the large hole portion of the keyhole on the holder over the hanger bolt head, and then through the hole with the thumb screw head, aligning the upper section of the keyhole which will then accept the shank of the thumb screw by sliding downward through the tightened smaller area. The holder will be locked into place, and not able to be lifted out of place, except with a little extra pressure.

The drink holder portion of this invention is constructed and adapted to be mounted on the shank of the thumb screw no matter where or how this thumb screw is mounted. The drink holder attachment will maintain an upright position to prevent spillage regardless of the movement or change in orientation of the support member.

BRIEF DESCRIPTION OF THE DRAWING

FIG. 1 is a perspective view of a collapsible golf cart with the carrier of the present invention secured to the handle thereof, a golf bag being shown in phantom outline.

FIG. 2 is a partial elevational view, showing the mounting bracket of the carrier of FIGS. 5, 6, 7, and 8; and FIG. 3 is a front elevational view of a portion of the beverage holder of FIG. 2.

FIG. 4 is an enlarged perspective view of the beverage holder of FIG. 1.

DESCRIPTION OF THE PREFERRED EMBODIMENT

Figure 5:
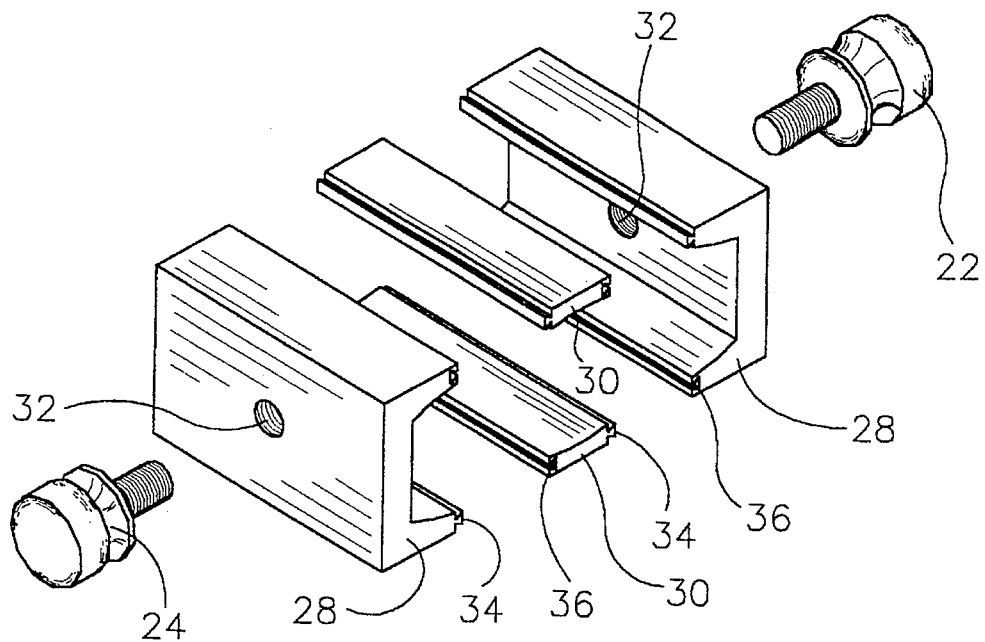
FIG. 5 is an exploded view of the mounting bracket in FIGS. 3 and 6.

Referring now to the drawings, the invention includes a beverage holder as shown in FIG. 4, that is pivotally mounted and means for securing the bracket 28, and bracket extension 30, to a tubular member, such as the handle 10 of a conventional or collapsible manual golf bag cart 12. The frame of the cart 12, including handle 10, is rotated about the axis of the cart wheels as it is moved between an upright, stationary position and a tilted position for pulling or pushing the cart upon its wheels.

Figure 6:
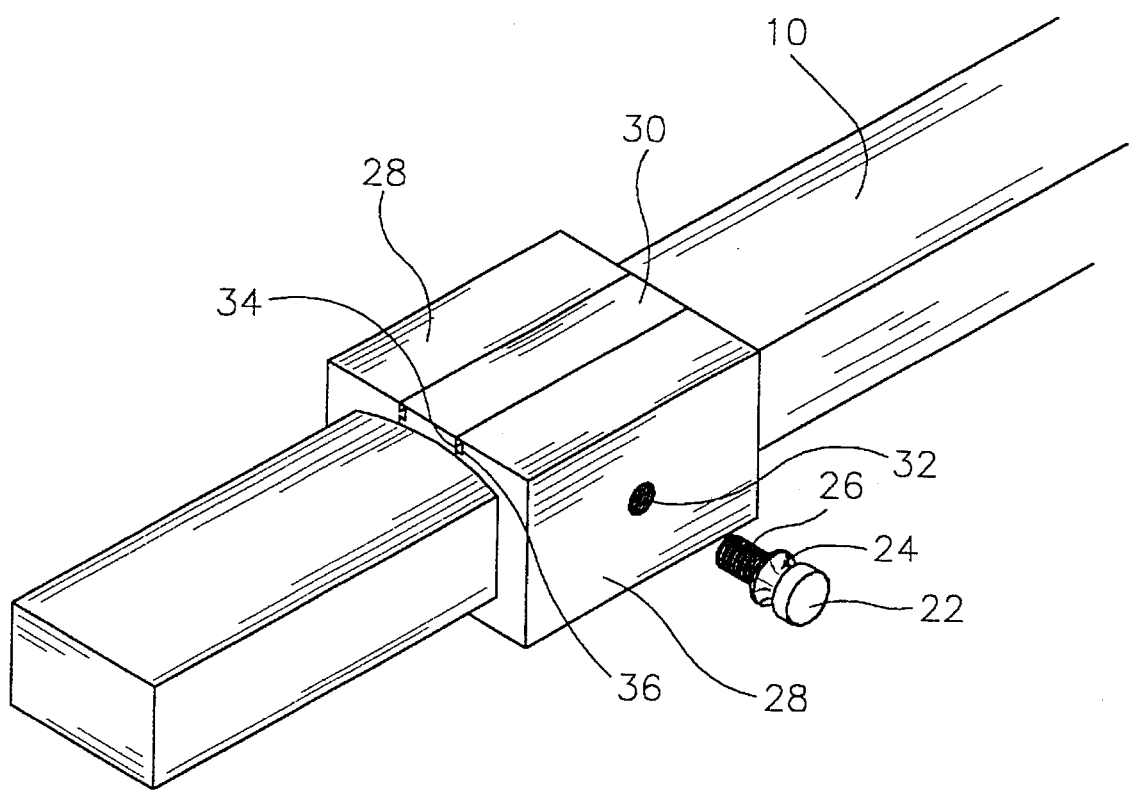
FIG. 6 is an enlarged perspective view of the carrier of FIG. 1.
Figure 7:
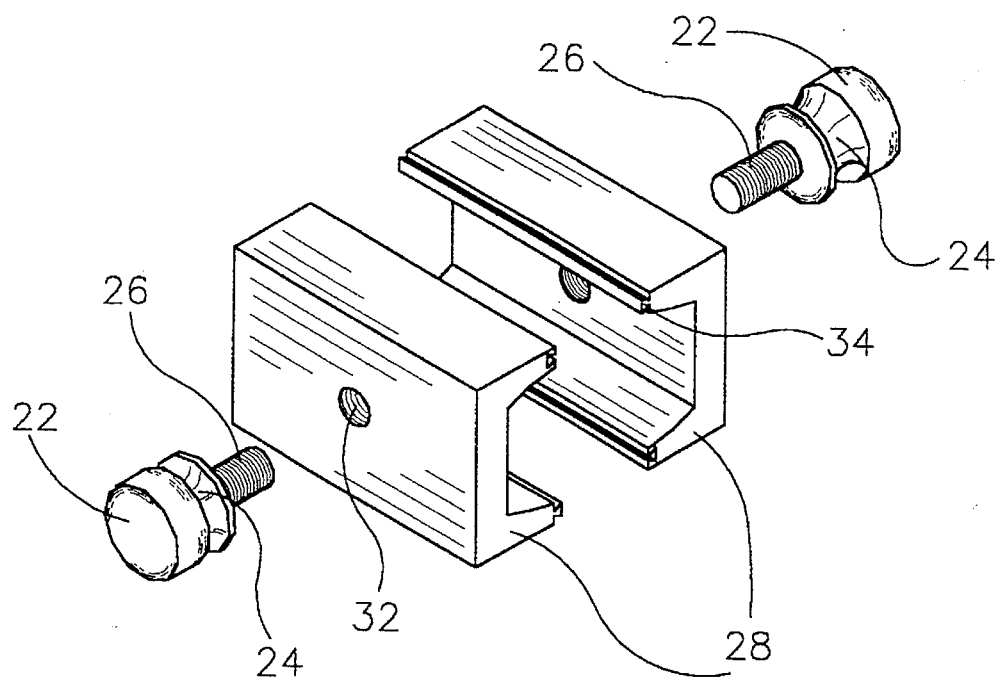
FIG. 7 is an exploded view of another possible combination the of mounting bracket in FIG. 1.
Figure 8:
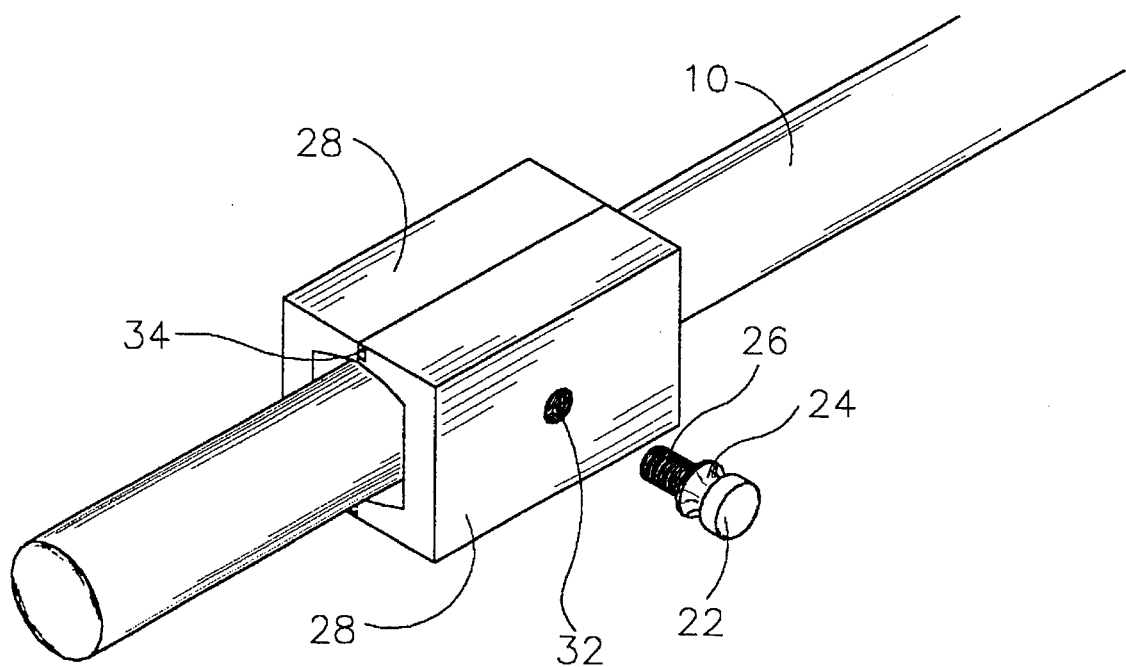
FIG. 8 is an enlarged perspective view of the carrier of FIG. 1 with a different size tubular structure of said cart.

The beverage container holder brackets are shown in a first embodiment in FIGS. 5 and 6, and in a second embodiment in FIGS. 7 and 8. The bracket 28 and bracket extension 30, and means for securing the device to a handle 10 are basically the same in both embodiments, whereby common reference numerals are used for these elements throughout the several views.

The bracket is made up of two sides that are equipped with male slots 34 and female slots 36 for interconnecting the two brackets 28 together, or a bracket 28 and a bracket extension 30 by a sliding motion. In addition to the cup holder brackets 28, there are also bracket extensions 30, that give the unit the ability to adapt to different size handles 10. Each cup holder bracket 28, and bracket extension 30, is equipped with one male dovetail joint 34, and one female dovetail-joint 36.

Once the joints are slid together over the tubular member such as the handle 10 of a golf bag cart 12, the thumb screw threads 26 are then screwed into the hole 32 on each side of the cup holder bracket 28, until there is a sufficient amount of pressure caused by tightening down the thumb screws threads 26 against the outer walls of the tubular member known as the handle 10 in this application. This will give an outwardly pressure to the cup holder brackets 28 and keep the dovetail joints 34 and 36 from sliding out of position on either the cup holder brackets 28 or the bracket extensions 30.

Referring now to the beverage container holder of FIG. 4, it is made up of 4 parts. They are the beverage container holder 20, the mug handle slot 18 cut into the container holder portion 20, the container holder portion mounting arm 14 that gives the beverage container holder support between the cup holder bracket 28 and the container holder portion 20, and the key hole slot 16, near the top of the top of the container holder arm 14. The key hole slot 16 will have a hole large enough to accept the head of knurled thumb screw 22, and on the upper portion a slot wide enough to accept the thumb screw shank 24, and in between these two sections of the key hole 16, there will be an area slightly smaller in width than the upper section of the key hole 16. The holder arm 14 may be quickly snapped on and off from the thumb screw shank 24 and the over the thumb screw head 22.

I claim:

1. A beverage carrier for mounting to a frame member, comprising:

a first bracket portion having an angled cavity, a threaded aperture, and a first male slot on one side and a first female slot on another side;

a second bracket portion having an angled cavity, a threaded aperture, and a second male slot on one side and a second female slot on another side, the first and second bracket portions being placed around the frame member and the first male slot and the second female slot being engaged and the first female slot and the second male slot being engaged;

a pair of thumbscrews having a threaded portion, a head portion, and a shank portion, the threaded portion being threaded into the threaded apertures in the first and second bracket portions and engaging the frame member such that there is sufficient pressure to prevent the male and female slots from sliding out of engagement; and a beverage holder portion having a mounting arm, the mounting arm having a keyhole slot therein with a lower portion, a middle portion and an upper portion, the lower portion of the keyhole slot being of a size sufficient to fit over the head portion of the thumbscrew, the upper portion being of a size sufficient to accept the shank portion of the thumbscrew, and the middle portion being smaller than upper portion, whereby the mounting arm of the beverage holder portion can be attached to the thumbscrew by placing the lower portion of the keyhole slot over the head portion of the thumbscrew and pulling the beverage holder portion down until the shank portion of the thumbscrew is within the upper portion of the keyhole slot, whereby the beverage carrier is maintained in an upright position despite movement and changes in orientation of the frame member.

2. The beverage carrier of claim 1 wherein the beverage holder portion has an open-ended slot in one side for receiving a mug handle.

3. The beverage carrier of claim 1 further comprising a first bracket extension having a third male slot on one side and a third female slot on the other side, and a second bracket extension having a fourth male slot on one side and a fourth female slot on the other side, the first and second bracket portions and first and second bracket extensions being placed around the frame member and the first male slot and the third female slot being engaged and the third male slot and the second female slot being engaged, and the first female slot and the fourth male slot being engaged and the fourth female slot and the second male slot being engaged.

4. The beverage container of claim 3 further comprising one or more sets of the first and second bracket extensions wherein each set of the first and second bracket extensions is of a different size, whereby by proper selection the set of first and second bracket extensions any size of the frame member may be accommodated.

\* \* \* \* \*